United States Patent
Rouet et al.

(10) Patent No.: US 8,260,022 B2
(45) Date of Patent: Sep. 4, 2012

(54) AUTOMATIC CARDIAC BAND DETECTION OF BREAST MRI

(75) Inventors: Jean-Michel Rouet, Paris (FR); Johannes Buurman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 819 days.

(21) Appl. No.: 12/294,488

(22) PCT Filed: Mar. 22, 2007

(86) PCT No.: PCT/IB2007/051011
§ 371 (c)(1),
(2), (4) Date: Sep. 25, 2008

(87) PCT Pub. No.: WO2007/113720
PCT Pub. Date: Oct. 11, 2007

(65) Prior Publication Data
US 2010/0239141 A1  Sep. 23, 2010

(30) Foreign Application Priority Data
Mar. 30, 2006 (EP) .................................... 06300309

(51) Int. Cl.
*G06K 9/00* (2006.01)
(52) U.S. Cl. ...................................................... 382/131
(58) Field of Classification Search .................... 382/131
See application file for complete search history.

(56) References Cited

U.S. PATENT DOCUMENTS

| | | | |
|---|---|---|---|
| 4,559,557 A | 12/1985 | Keyes et al. | |
| 5,879,302 A * | 3/1999 | Hashimoto et al. | 600/441 |
| 6,112,112 A | 8/2000 | Gilhuijs et al. | |
| 7,024,027 B1 * | 4/2006 | Suri et al. | 382/130 |
| 7,792,240 B2 * | 9/2010 | Teramoto | 378/8 |
| 2003/0166999 A1 * | 9/2003 | Liu et al. | 600/410 |
| 2004/0052328 A1 | 3/2004 | Sabol et al. | |
| 2005/0027188 A1 | 2/2005 | Metaxas et al. | |
| 2005/0137476 A1 * | 6/2005 | Weiland | 600/416 |

(Continued)

FOREIGN PATENT DOCUMENTS
WO  2005015502 A  2/2005

OTHER PUBLICATIONS

Umejima M et al: "A bump-circuit-based motion detector using projected-activity histograms" Circuits and Systems, 2004. ISCAS '04. Proceedings of the 2004 International Symposium on Vancouver, BC, Canada 23-26, May 23, 2004, XP010719441 ISBN: 0-7803-8251-X.

(Continued)

*Primary Examiner* — Rodney Fuller (57) ABSTRACT

The invention relates to a method of processing temporally acquired image data with an obtaining step for obtaining the temporally acquired image data, a computing step for computing a time-variability map on the basis of the temporally acquired image data, a classifying step for classifying locations of the temporally acquired image data on the basis of the time-variability map, and a determining step for determining an artifact region and a non-artifact region in the temporally acquired image data on the basis of the classified locations. After determining the artifact region and the non-artifact region, detecting an object in a detecting step is limited to the non-artifact region. This advantageously reduces the risk of falsely identifying the detected object as an object of interest.

11 Claims, 8 Drawing Sheets

U.S. PATENT DOCUMENTS

2005/0213849 A1*  9/2005  Kreang-Arekul et al. .... 382/284

OTHER PUBLICATIONS

Nobuyuki Otsu: A Threshold Selection Method From Gray-Level Histograms, IEEE Transaction on System, Man, and Cybernetics, vol. SMC-9, No. 1, Jan. 1979, pp. 62-66 XP000617438.

J. S. Suri, et al: Shape Recovery Algorithms Using Level Sets in 2-D/3-D Medical Imagery: A State-of-the-Art Review, IEEE Transactions on Information Technology in Biomedicine, vol. 6, No. 1, Mar. 2002 pp. 8-28.

HTTP://HOMEPAGES.INF.ED.AC.UK/RBF/HIPR2/FILTOPS.HTM, downloaded Apr. 3, 2012, pp. 1-3.

HTTP://HOMEPAGES.INF.ED.AC.UK/RBF/HIPR2/MEAN.HTM, downloaded Apr. 3, 2012, pp. 1-6.

HTTP://HOMEPAGES.INF.ED.AC.UK/RBF/HIPR2/GSMOOTH.HTM, downloaded Apr. 3, 2012, pp. 1-8.

HTTP://HOMEPAGES.INF.ED.AC.UK/RBF/HIPR2/MOROPS.HTM, downloaded Apr. 3, 2012, pp. 1-3.

HTTP://HOMEPAGES.INF.ED.AC.UK/RBF/HIPR2/CLOSE.HTM, downloaded Apr. 3, 2012, pp. 1-7.

HTTP://HOMEPAGES.INF.ED.AC.UK/RBF/HIPR2/DILATE.HTM, downloaded Apr. 3, 2012, pp. 1-9.

HTTP://HOMEPAGES.INF.ED.AC.UK/RBF/HIPR2/ERODE.HTM, downloaded Apr. 3, 2012, pp. 1-8.

* cited by examiner

AUTOMATIC CARDIAC BAND DETECTION OF BREAST MRI

This application is a national filing of PCT application Serial No PCT/IB2007/051011, filed Mar. 22, 2007.

This invention relates to a method of processing temporally acquired image data.

The invention further relates to a system for processing temporally acquired image data.

The invention further relates to an image acquisition apparatus comprising said system.

The invention further relates to a workstation comprising said system.

The invention further relates to a computer program product comprising instructions for performing said method when the program product is run on a computer.

An implementation of the method of the kind described in the opening paragraphs is presented in U.S. Pat. No. 6,112,112. This document describes a method of assessment of tumor extent in temporally acquired image data. The described method comprises obtaining temporally acquired image data and performing variance processing on the obtained image data to compute variance image data defining a variance image indicative of variation of voxels in the temporally acquired image data. The variance image data is used to enhance the image of a structure of interest, e.g. a lesion, and to assess the extent of the lesion. The lesion location is an input from either a human or a computer. While the human interaction to determine the location of the lesion is often inconvenient, the determination of the location of the lesion by a computer is prone to error due to the presence of an object, e.g. a blood vessel, in the thoracic cage, which can be falsely identified as the lesion.

It is an object of the invention to provide a method that improves processing temporally acquired image data.

This object of the invention is achieved in that the method of processing temporally acquired image data comprises:

an obtaining step for obtaining the temporally acquired image data;

a computing step for computing a time-variability map on the basis of the temporally acquired image data;

a classifying step for classifying locations of the temporally acquired image data on the basis of the time-variability map; and a determining step for determining an artifact region and a non-artifact region in the temporally acquired image data on the basis of the classified locations.

An element of a temporally acquired image data comprises a location, an acquisition time, and an intensity corresponding to said location and to said acquisition time. An element of a time-variability map comprises a location and a time-variability of intensities acquired at this location. The time-variability of intensities acquired at a location is described by the variance of time-derivatives of intensities computed in the computing step on the basis of the plurality of intensities at this location. In the classifying step, the time-variability map is used to classify locations comprised in the image data and in the time-variability map. Locations having time-variability larger than a threshold are classified as artifact locations. The threshold is determined using the Otsu method of threshold selection, which minimizes the variance of the time-variability of artifact locations and the variance of time-variability of non-artifact locations, and which is described in the article "A Threshold Selection Method from Gray Level Histograms", by Otsu, N., published in *IEEE Trans. on Systems, Man, and Cybernetics*, vol. SMC-9, no. 1, January 1979, pp. 62-66, hereinafter referred to as Ref 1. The artifact region comprises a set of artifact locations. Optionally, the artifact region comprises locations included in a connected component of the set of artifact locations. The complement of the artifact region determines the non-artifact region of the temporally acquired image data. Knowing the artifact and non-artifact regions of the temporally acquired image data improves the processing of the temporally acquired image data in subsequent processing steps, e.g. in a detecting step for detecting structures of interest in the image data. For example, the method is useful for processing temporally acquired image data comprising breast Magnetic Resonance Imaging (MRI) scans. These MRI scans cover a region larger than the breasts themselves and typically comprise the thoracic cage, and particularly the heart and the aorta. During a breast MRI scan, a contrast agent is injected into the blood stream and a series of dynamic images are acquired. In the region of a tumor the temporally acquired image data will be characterized by varying intensities. A Computer Aided Detection (CAD) system will therefore analyze the time variation of the intensities in the temporally acquired image data to detect a tumor. Since the heart and the aorta not only move, but also contain a large amount of blood and of the contrast agent used in breast MRI scans, these organs may produce artifacts in reconstructed images, which may be erroneously identified as objects of interest by the CAD system. By condoning these organs in the artifact region, the present method reduces the risk of falsely identifying an object such as a blood vessel as the object of interest such as a tumor. Thus, the method improves the processing of temporally acquired image data.

In a further implementation of the method, the method further comprises a first projecting step for obtaining a first projection map on the basis of a first projection of the time-variability map in a first projection direction. For example, in the case of the temporally acquired image data comprising axial breast MRI scans, the Minimum Intensity Projection (mIP) may be applied to the time-variability map in the sagittal direction. Using the first projection map further improves classifying locations comprised in the temporally acquired image data.

In a further implementation of the method, the method further comprises a second projecting step for obtaining a second projection map on the basis of a second projection of the first projection map in a second projection direction. For example, in the case of the temporally acquired image data comprising axial breast MRI scans, the Minimum Intensity Projection (mIP) may be applied to the time-variability map in the axial direction. Using the second projection map further improves classifying locations comprised in the temporally acquired image data.

In a further implementation of the method, the method further comprises a first filtering step for filtering the time-variability map. The time-variability map is filtered using a smoothing filter to remove noise from the time-variability map. Optionally, the first projection map and/or the second projection map may be smoothed using a smoothing filter.

In a further implementation of the method, the method further comprises a second filtering step for filtering the classified locations of the temporally acquired image data. The set of artifact locations is filtered using a closing operator to fill small holes in the set of artifact locations. Optionally, the first projection map or the second projection map may be smoothed using a closing operator.

In a further implementation of the method, the artifact region is an artifact band. The artifact band comprises locations between a front band-limit and a back band-limit surface. A front band-limit and a back band-limit are easy to calculate on the basis of the first projection map.

In a further implementation of the method, the method further comprises a detecting step for detecting an object in the non-artifact region. After determining the artifact region and the non-artifact region, detecting the object is limited to the non-artifact region. This advantageously reduces the risk of falsely detecting the object as an object of interest.

It is a further object of the invention to provide a system of the kind described in the opening paragraphs that improves processing temporally acquired image data. This is achieved in that the system for processing temporally acquired image data comprises:

an obtaining unit for obtaining the temporally acquired image data;

a computing unit for computing a time-variability map on the basis of the temporally acquired image data;

a classifying unit for classifying locations of the temporally acquired image data on the basis of the time-variability map; and a determining unit for determining an artifact region and a non-artifact region in the temporally acquired image data on the basis of the classified locations.

It is a further object of the invention to provide an image acquisition apparatus of the kind described in the opening paragraphs that improves processing temporally acquired image data. This is achieved in that the image acquisition apparatus comprises the system for processing temporally acquired image data comprising:

an obtaining unit for obtaining the temporally acquired image data;

a computing unit for computing a time-variability map on the basis of the temporally acquired image data;

a classifying unit for classifying locations of the temporally acquired image data on the basis of the time-variability map; and a determining unit for determining an artifact region and a non-artifact region in the temporally acquired image data on the basis of the classified locations.

It is a further object of the invention to provide a workstation of the kind described in the opening paragraphs that improves processing temporally acquired image data. This is achieved in that the workstation comprises the system for processing temporally acquired image data comprising:

an obtaining unit for obtaining the temporally acquired image data;

a computing unit for computing a time-variability map on the basis of the temporally acquired image data;

a classifying unit for classifying locations of the temporally acquired image data on the basis of the time-variability map; and a determining unit for determining an artifact region and a non-artifact region in the temporally acquired image data on the basis of the classified locations.

It is a further object of the invention to provide a computer program product of the kind described in the opening paragraphs that improves processing temporally acquired image data. This is achieved in that the computer program product, to be loaded by a computer arrangement, comprises instructions for processing temporally acquired image data, the computer arrangement comprising a processing unit and a memory, the computer program product, after being loaded, providing said processing unit with the capability to carry out the following tasks:

obtaining the temporally acquired image data;

computing a time-variability map on the basis of the temporally acquired image data;

classifying locations of the temporally acquired image data on the basis of the time-variability map; and determining an artifact region and non-artifact region in the temporally acquired image data on the basis of the classified locations.

Modifications, and variations thereof, of the system, the image acquisition apparatus, the workstation, and/or the computer program product described, which correspond to modifications of the method and variations thereof, can be carried out by a skilled person on the basis of the present description.

The method of the present invention is especially useful when applied to temporally acquired 2D or 3D magnetic resonance image data. However, the skilled person will appreciate that the method may be also applied to temporally acquired image data generated by other acquisition modalities such as, but not limited to, Computed Tomography (CT), Ultrasound (US), Positron Emission Tomography (PET), Single Photon Emission Computed Tomography (SPECT), and Nuclear Medicine.

These and other aspects of the invention will be apparent from and elucidated with respect to the implementations and embodiments described hereinafter and with reference to the accompanying drawings, wherein.

The same reference numerals are used to denote similar parts throughout the Figures.

Figure 1:
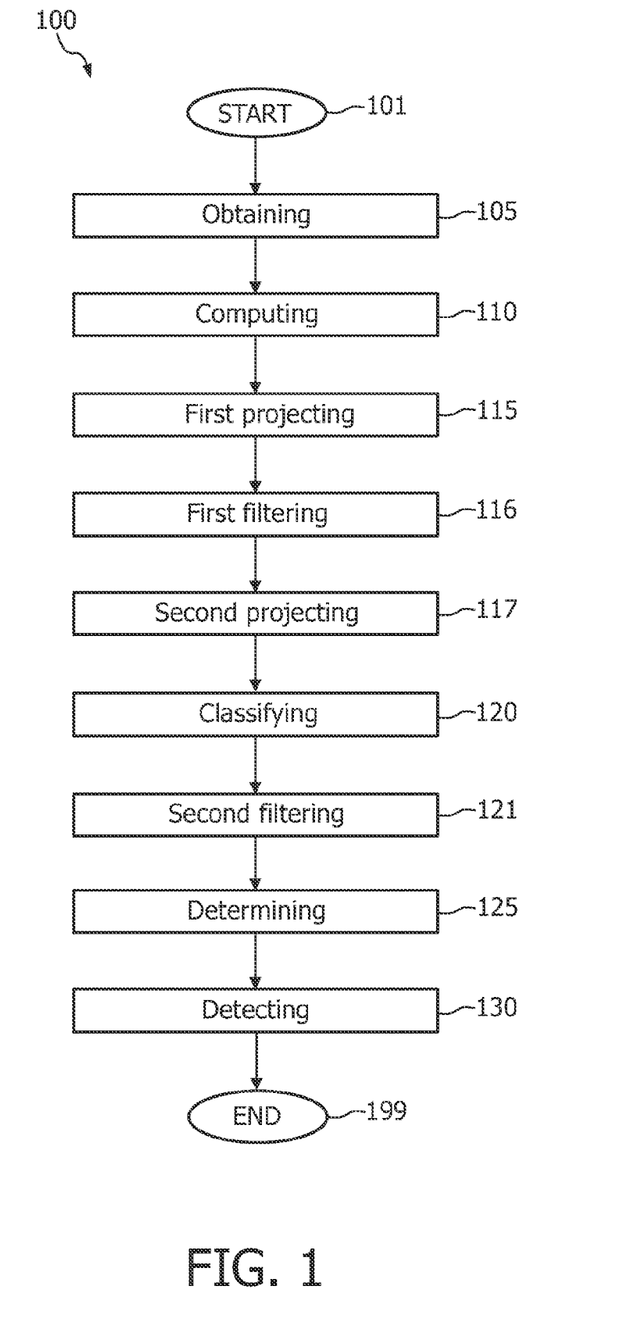
FIG. 1 shows a flowchart of an exemplary implementation of the method.

FIG. 1 shows a flowchart of an exemplary implementation of the method 100. After a starting step 101, the method 100 continues to an obtaining step 105 for obtaining a temporally acquired image data. After the obtaining step 105, the method 100 continues to a computing step 110 for computing a time-variability map on the basis of the temporally acquired image data. The method 100 then continues to a first projecting step 115 for projecting the time-variability map in a first projection direction, thereby determining a first projection map. After the first projecting step 115, the method 100 continues to a first filtering step 116 for filtering the time-variability map. The method then continues to a second projecting step 117 for projecting the first projection map in a second projection direction, thereby determining a second projection map. After the second projecting step 117, the method continues to a classifying step 120 for classifying locations comprised in the temporally acquired image data. After the classifying step 120, the method 100 continues to a second filtering step 121 for filtering the classified locations. In the determining step 125, an artifact region and a non-artifact region are determined. The method 100 then continues to a detecting step 130 for detecting an object in the non-artifact region. Finally, the method 100 continues to a terminating step 199.

A temporally acquired image data element is a triplet (r, t, I), where r is a spatial location in the temporally acquired image data, typically represented by a vector of cartesian coordinates (x, y, z), t is an acquisition time, and I is an intensity at location r at time t. The temporally acquired image data may also be referred to as a temporal image map J which assigns an image intensity I to the spatial-temporal coordinates (r, t) of the temporally acquired image data element (r, t, I):

$$J(r,t)=I.$$

The temporally acquired image data is obtained in the obtaining step 105 of the method 100. Data elements which are not comprised in the temporally acquired image data, and which are needed for processing the data are derived from the obtained temporally acquired image data using interpolation and/or extrapolation in a further step of the method 100. The interpolated and extrapolated data elements, too, are referred to as being comprised in the temporally acquired image data.

Figure 2:
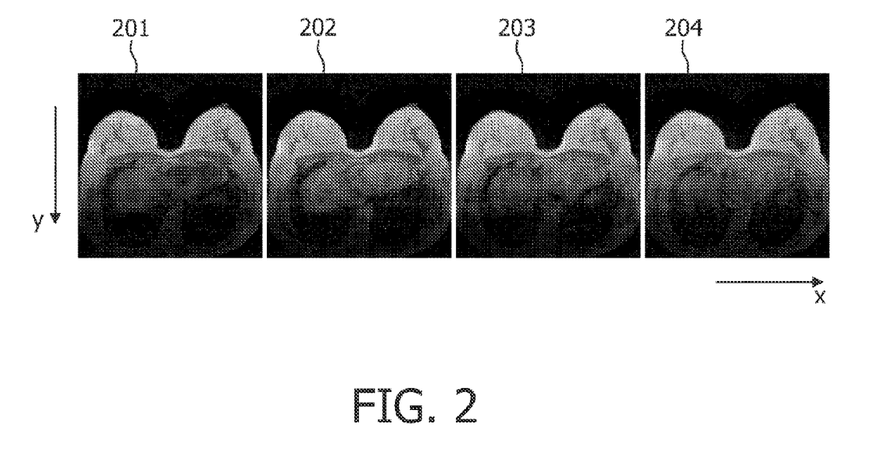
FIG. 2 shows axial views of a typical breast MRI scan at four different acquisition times.

FIG. 2 shows exemplary axial views rendered from temporally acquired image data comprising axial breast MRI scans. The first image 201 shows an axial view at the start of the image data acquisition, the second image 202 shows the same axial view after 2 min 8 sec, the third image 203 shows the same axial view after 4 min 1 sec, and the fourth image 204 shows the same axial view after 5 min 23 sec. The x axis of the cartesian coordinate system is substantially parallel to the sagittal direction of the exemplary temporally acquired image data comprising axial breast MRI scans, the y axis of the cartesian coordinate system is substantially parallel to the coronal direction of the exemplary temporally acquired image data comprising axial breast MRI scans, and the z axis of the cartesian coordinate system is substantially parallel to the axial direction of the exemplary temporally acquired image data comprising axial breast MRI scans.

Hereinafter, the temporally acquired image data comprising axial breast MRI scans is used to illustrate the method 100 and various implementations of said method 100. The skilled person will understand that the method 100 can be easily modified to describe temporally acquired image data acquired by another sequence of breast MRI scans, e.g. sagittal scans, or to describe temporally acquired image data acquired by a different image acquisition apparatus, e.g. a CT scanner.

In the computing step 110 of the method 100, a time-variability map σ is computed on the basis of the temporally acquired image data. A value σ(x, y, z) of the time-variability map σ describes the time-variability of intensities at a location (x, y, z). For example, a time-variability map $\sigma_1$ is defined as the variance of the time-derivative v of the temporal image map J:

$$\sigma_1(x, y, z) = \frac{1}{N}\sum_t (v(x, y, z, t) - \overline{v}(x, y, z))^2$$

where $$v(x, y, z, t) = \frac{\partial J(x, y, z, t)}{\partial t}$$

is the time-derivative of the temporal image map J, $$\overline{v}(x, y, z) = \frac{1}{N}\sum_t v(x, y, z, t)$$

is the average time-derivative at a location (x, y, z), and N is the number of time-derivatives v(x, y, z, t) used to compute $\sigma_1(x, y, z)$ and $\overline{v}(x, y, z)$. These time-derivatives are derived from the temporally acquired image data, optionally using interpolation and/or extrapolation. Another example of the time-variability map is the absolute intensity range map:

$$\sigma_2(x, y, z) = \sup_t \{J(x, y, z, t)\} - \inf_t \{J(x, y, z, t)\}$$

Optionally, the time-variability map may be filtered. The filtering may be carried out using a horizontal (sagittal direction) gaussian smoothing filter, for example.

Figure 3:
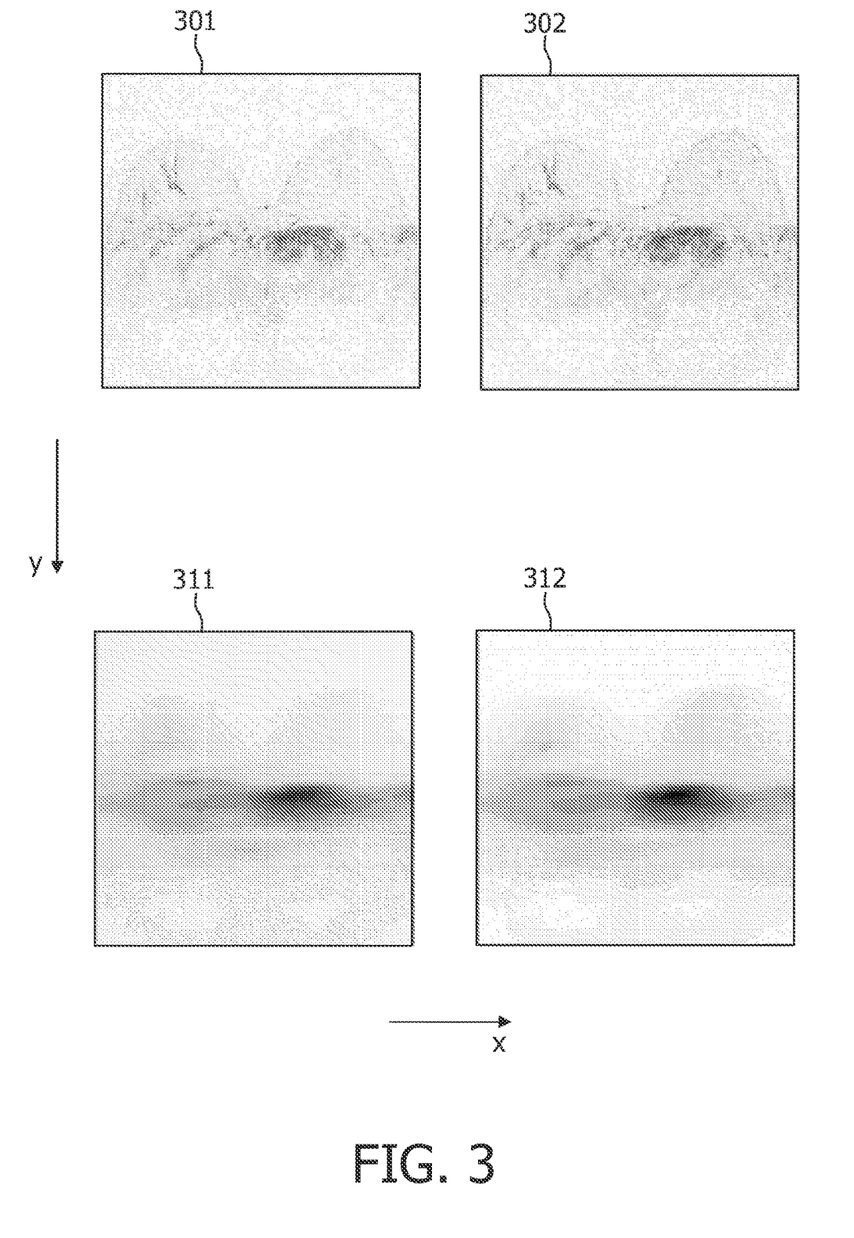
FIG. 3 shows exemplary axial views of exemplary time-variability maps.

Exemplary time-variability maps computed from the exemplary temporally acquired image data comprising axial breast MRI scans are illustrated in FIG. 3. The first top-row image 301 shows an axial view of the time-variability map $\sigma_1$ and the second top-row image 302 shows an axial view of the time-variability map $\sigma_2$. The bottom row in FIG. 3 shows the two axial views of the first row after applying a horizontal gaussian smoothing filter. In all views, the values of $\sigma_1$ and $\sigma_2$ and of smoothed $\sigma_1$ and $\sigma_2$ are mapped into the image grayscale for graphically displaying said values using shades of gray.

In an implementation of the method 100, the method 100 further comprises the first projecting step 115 for obtaining a first projection map on the basis of a first projection of the time-variability map in a first projection direction. The first projection map is obtained by applying the first projection to the time-variability map. The first projection map maps a first projection domain comprised in a first projection plane into a range of values. A location in the first projection domain is assigned a value derived on the basis of the values of the time-variability map along a first projection ray substantially parallel to the first projection direction and crossing the first projection plane substantially at said location. In the exemplary application of the method 100 to the exemplary temporally acquired image data comprising axial breast MRI scans, the first projection is a sagittal projection $m_x$. The sagittal projection $m_x$ transforms a time-variability map σ into a first projection map $m_x(\sigma)$. The first projection direction is a direction substantially parallel to the sagittal axis x. The first projection plane is substantially identical with the sagittal plane yz. For example, the first projection map may be defined as:

the mean projection map:

$$m_{x1}(\sigma)(y, z) = \frac{1}{N_x}\sum_x \sigma(x, y, z)$$

where $N_x$ is the number of values σ(x, y, z) of the time-variability map σ along the first projection ray substantially parallel to the first projection direction and crossing the first projection plane substantially at (y, z);

the minimum intensity projection (mIP) map:

$$m_{x2}(\sigma)(y, z) = \inf_x \{\sigma(x, y, z)\};$$

the maximum intensity projection (MIP) map:

$$m_{x3}(\sigma)(y, z) = \sup_x \{\sigma(x, y, z)\}.$$

Optionally, the first projection map may be filtered. The filtering may be carried out using a gaussian smoothing filter in the coronal direction, for example.

Figure 4:
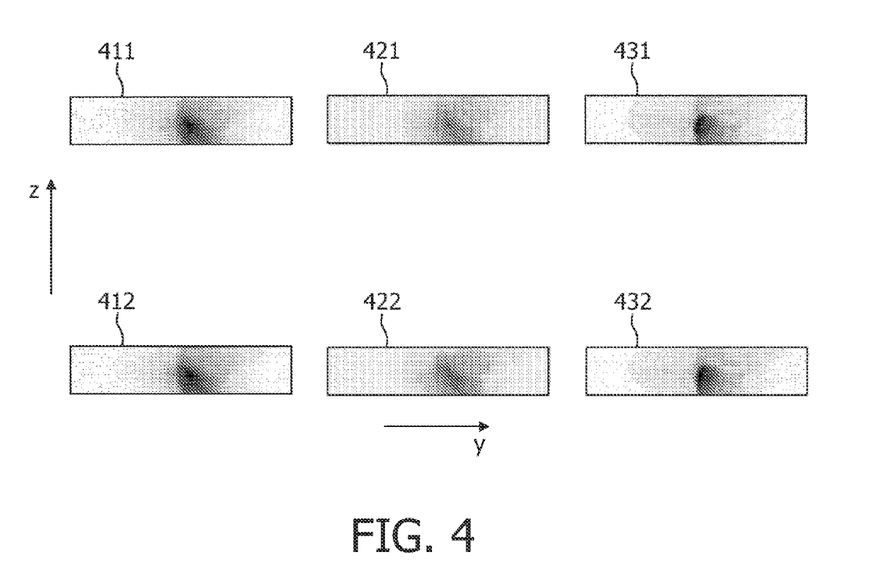
FIG. 4 shows exemplary first projection maps.

FIG. 4 shows exemplary first projection maps computed on the basis of the first projection of the time-variability map in the first projection direction. The first top-row image 411 shows the mean projection map $m_{x1}(\sigma_1)$, the second top-row image 421 shows the mIP projection map $m_{x2}(\sigma_1)$, and the third top-row image 431 shows the MIP projection map $m_{x3}(\sigma_1)$. These projection maps are computed on the basis of projecting the time-variability map $\sigma_1$, defined as the variance of the time-derivative of the intensity map of the exemplary temporally acquired image data comprising axial breast MRI scans, in the sagittal direction. Similarly, the first bottom-row image 412 shows the mean projection map $m_{x1}(\sigma_2)$, the second bottom-row image 422 shows the mIP projection map $m_{x2}(\sigma_2)$, and the third bottom-row image 432 shows the MIP projection map $m_{x3}(\sigma_2)$. These projection maps are computed on the basis of projecting the time-variability map $\sigma_2$, defined as the absolute intensity range map of the exemplary temporally acquired image data comprising axial breast MRI scans, in the sagittal direction. The values of the shown projection maps are mapped into the image grayscale for graphically displaying said values using shades of gray.

In an implementation of the method 100, the method 100 further comprises the second projecting step 117 for obtaining a second projection map of the first projection map in a second projection direction. The second projection map is obtained by applying a second projection to the first projection map. The second projection map maps a second projection domain, comprised in a second projection line comprised in the first projection plane, into a range of values. A location in the second projection domain is assigned a value derived on the basis of the values of the first projection map along a second projection ray substantially parallel to the second projection direction and crossing the second projection line substantially at said location. In the exemplary application of the method 100 to the exemplary temporally acquired image data comprising axial breast MRI scans, the second projection is an axial projection $n_z$. The axial projection $n_z$ transforms the first projection map $m_x(\sigma)$ into the second projection map $n_z(m_x(\sigma))$. The second projection direction is a direction substantially parallel to the axial axis z. The second projection line is substantially identical with the coronal axis y. For example, the second projection may be defined, using the mIP projection, as $$n_z(m_x(\sigma))(y) = \inf_z \{m_x(\sigma)(y,z)\},$$

or, using the MIP projection, as $$n_z(m_x(\sigma))(y) = \sup_z \{m_x(\sigma)(y,z)\}.$$

Optionally, the second projection map may be filtered. The filtering may be carried out using a gaussian smoothing filter in the coronal direction, for example.

In an implementation of the method 100, the method 100 further comprises the first filtering step 116 for filtering the time-variability map. The filtering may be carried out using a spatial filter such as, but not limited to, a mean filter, a gaussian smoothing filter, and/or a frequency filter. A digital filter may be applied to the time-variability map, to the first projection map, and/or to the second projection map. The digital filters are described in the article "Digital filters" available at http://homepages.inf.ed.ac.uk/rb/HIPR2/filtops.htm. Mean filtering is used to eliminate values of a map which are unrepresentative of their surroundings. Mean filtering replaces a value at a certain location with the mean value based on the values at locations surrounding the certain location. Mean filtering of 2D images is described in the article available at http://homepages.inf.ed.ac.uk/rbf/HIPR2/mean.htm. The Gaussian smoothing operator is a convolution operator that is used to "blur" images and to remove detail and noise. 2D Gaussian smoothing is described in the article available at htt://homepages.inf.ed.ac.uk/rbf/HIPR2/gsmooth.htm. The skilled person will understand that applying other filters may be also useful.

In the classifying step 120 of the method 100, locations of the temporally acquired image data are classified on the basis of the time-variability map. More particularly, if a value $\sigma(X, Y, Z)$ of the time-variability map $\sigma$ at a location $(X, Y, Z)$ is greater than a threshold, then the location $(X, Y, Z)$ is classified as an artifact location. Alternatively, the locations may be classified applying another segmentation technique, e.g. a technique based on level sets, to the time-variability map. Techniques based on level sets are described in the article "Shape recovery algorithms using level sets in 2-D/3-D medical imagery: a state-of-the-art review" by J. S. Suri, Kecheng Liu, S. Singh, S. N. Laxminarayan, Xiaolan Zeng, and L. Reden, in Information Technology in IEEE Transactions on Biomedicine, Volume 6, Issue 1, March 2002 Pages: 8-28, hereinafter referred to as Ref. 2. Optionally, a location is classified as an artifact location if a plurality of conditions are satisfied. For example, the time-variability map may be required to satisfy a certain condition at a certain location and a further condition at a further location. Optionally, two time-variability maps $\sigma_1$ and $\sigma_2$ may be computed. If $\sigma_1(X,Y,Z)$ is greater than a first threshold and $\sigma_2(X, Y, Z)$ is greater than a second threshold, then the location $(X, Y, Z)$ is classified as an artifact location. A threshold may be a predetermined threshold or a user-determined threshold, for example.

Alternatively, in an implementation of the method 100, the locations of the temporally acquired image data are classified in the classifying step 120 on the basis of the first projection map. If a value $m_x(\sigma)(Y, Z)$ is greater than a threshold at a location $(Y, Z)$ in the first projection domain, then locations $(x, Y, Z)$ comprised in the exemplary temporally acquired image data comprising axial breast MRI scans and substantially located on the first projection ray intersecting the first projection plane at the location $(Y, Z)$ are classified as artifact locations. A threshold may be a predetermined threshold or a user-determined threshold. Alternatively, the locations may be segmented by applying another segmentation technique, e.g. a technique based on level sets, to the first projection map. Techniques based on level sets are described in Ref. 2. Optionally, several conditions may be used to classify a location as an artifact location. For example, two classifying conditions may be used. A location is classified as an artifact location if this location satisfies at least one classifying condition.

Alternatively, in an implementation of the method 100, the locations of the temporally acquired image data are classified in the classifying step 120 on the basis of the second projection map. If a value $n_z(m_x(\sigma))(Y)$ is greater than a threshold at a location Y in the second projection domain, then locations $(x, Y, z)$ comprised in the exemplary temporally acquired image data comprising axial breast MRI scans and substantially located on a plane intersecting the second projection domain at the location Y are classified as artifact locations.

Alternatively, the locations may be segmented by applying another segmentation technique, e.g. a technique based on level sets, to the second projection map. Techniques based on level sets are described in Ref 2. Optionally, several conditions may be used to classify a location as an artifact location. For example, two classifying conditions may be used. A location is classified as an artifact location if said location satisfies both classifying conditions.

In an implementation of the method 100, the second projection is used for computing a cut-off coordinate for the locations of the temporally acquired image data. In the exemplary application of the method 100 to the exemplary temporally acquired image data comprising axial breast MRI scans, the cut-off coordinate $y_{chest}$ is the maximum of the first derivative of the second projection map $n_z(m_x(\sigma))$. This cut-off coordinate $y_{chest}$ is used to bound the artifact locations: only locations (x, y, z) comprised in the exemplary temporally acquired image data for which $y \geq y_{chest}$ are eligible to become artifact locations in the classifying step 120.

Figure 5:
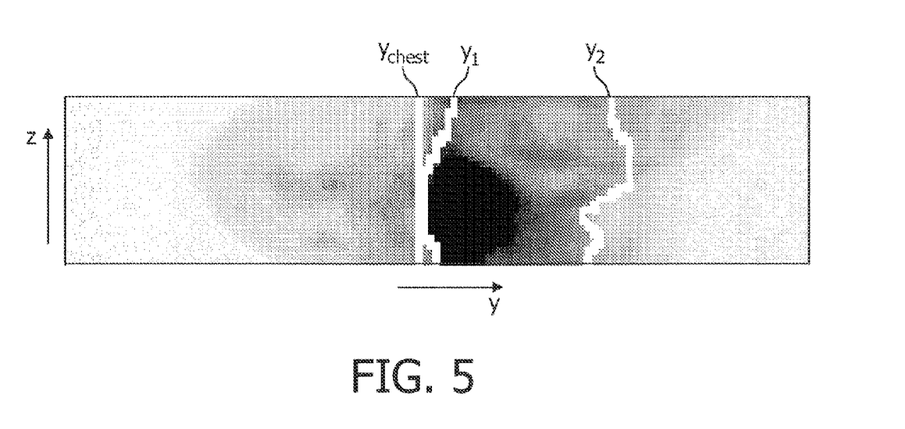
FIG. 5 shows exemplary front band-limit and back band-limit curves.

In an implementation of the method 100, a front band-limit curve and a back band-limit curve are used for classifying the locations of the temporally acquired image data in the classifying step 120. In the exemplary application of the method 100 to the exemplary temporally acquired image data comprising axial breast MRI scans, for each z satisfying the condition that there exists a location (y, z) comprised in the domain of the first projection map $m_x(\sigma)$, the front band-limit value $y_1(z)$ and the back band-limit value $y_2(z)$ are computed. First, for each z satisfying said condition, $y_1(z) \geq y_{chest}$ is computed as the location of the sharpest increase of values $m_x(\sigma)(y, z)$ in the direction of the y-axis. Next, for each z satisfying said condition, $y_2(z) \geq y_1(z)$ is computed as the rightmost location where the first projection-map value $m_x(\sigma)(y, z)$ is greater than a threshold, e.g.

$$\sup_{y \geq y_{chest}} \{m_x(\sigma)(y, z)\}/3.$$

illustrates front band-limit curve $y_1$ and the back band-limit curve $y_2$. The curves are displayed over the first projection map $m_{x3}(\sigma_1)$. Also, the cut-off coordinate $y_{chest}$ is shown. Optionally, the front band-limit and back band-limit curves defined by $y_1$ and $y_2$, respectively, are filtered using a smoothing filter, for example. The values of the shown projection map are mapped into the image grayscale for graphically displaying said values using shades of gray.

In an implementation of the method 100, the threshold for classifying locations of the temporally acquired image data is determined using the isodata algorithm, described in Ref 1, which minimizes the variance of the time-variability of artifact locations and the variance of time-variability of non-artifact locations. The isodata algorithm is an iterative algorithm based on a histogram of a map, e.g. of the first projection map. Optionally, the values of the map may be mapped into a grayscale of an image. Assuming that a current threshold value is the median of the histogram, for example, the intensities are split up into two parts: the foreground comprising intensities greater than the threshold and the background comprising intensities less than or equal to the threshold. Then, the average intensity of the foreground intensities and the average intensity of the background intensities are computed. A previous threshold is assigned the value of the current threshold. The current threshold is computed as the mean of the foreground average and the background average. This process is repeated until the current threshold and the previous threshold are substantially identical, e.g. until the absolute difference between the current threshold and the previous threshold is less than or equal to a predetermined number.

In an implementation of the method 100, the method 100 further comprises a second filtering step 121 for filtering the locations of the time-variability map. The classified locations are filtered using morphology operators such as, but not limited to, a closing operator, a dilation operator and an erosion operator. The morphology operators are described in the article "Morphology" available at http://homepages.inf.ed.ac.uk/rbf/HIPR2/morops.htm, the closing operator is described in the article "Closing" available at http://homepages.inf.ed.ac.uk/rb/HIPR2/close.htm, the dilation operator is described in the article "Dilating" available at http://homepages.inf.ed.ac.uk/rbf/HIPR2/dilate.htm, and the erosion operator for eroding boundaries of a set comprising locations is described in the article "Eroding" available at http://homepages.inf.ed.ac.uk/rbf/HIPR2/erode.htm. The morphology operator is applied to a set of classified locations of the temporally acquired image data. For example, the dilation operator enlarges the set of classified locations of the temporally acquired image data, the eroding operator erodes the boundaries of the set of classified locations of the temporally acquired image data, and the closing operator, which is a combination of the erosion operator followed by the dilation operator, can be used to fill the small holes in the set of classified locations of the temporally acquired image data.

In the determining step 125 of the method 100, the artifact region is determined on the basis of the classified locations of the temporally acquired image data set. The determining step 125 may be automatic or may involve an interaction with a user. In an implementation of the method 100, the determined artifact region comprises the set of artifact locations. Alternatively, the determined artifact region comprises the largest connected component of the set of artifact locations, e.g. a connected component comprising the largest number of locations or a connected component having the largest maximum diameter may be identified as the artifact region. The determined non-artifact region is the complement of the artifact region comprising locations of the temporally acquired image data that are not comprised in the artifact region.

Figure 6:
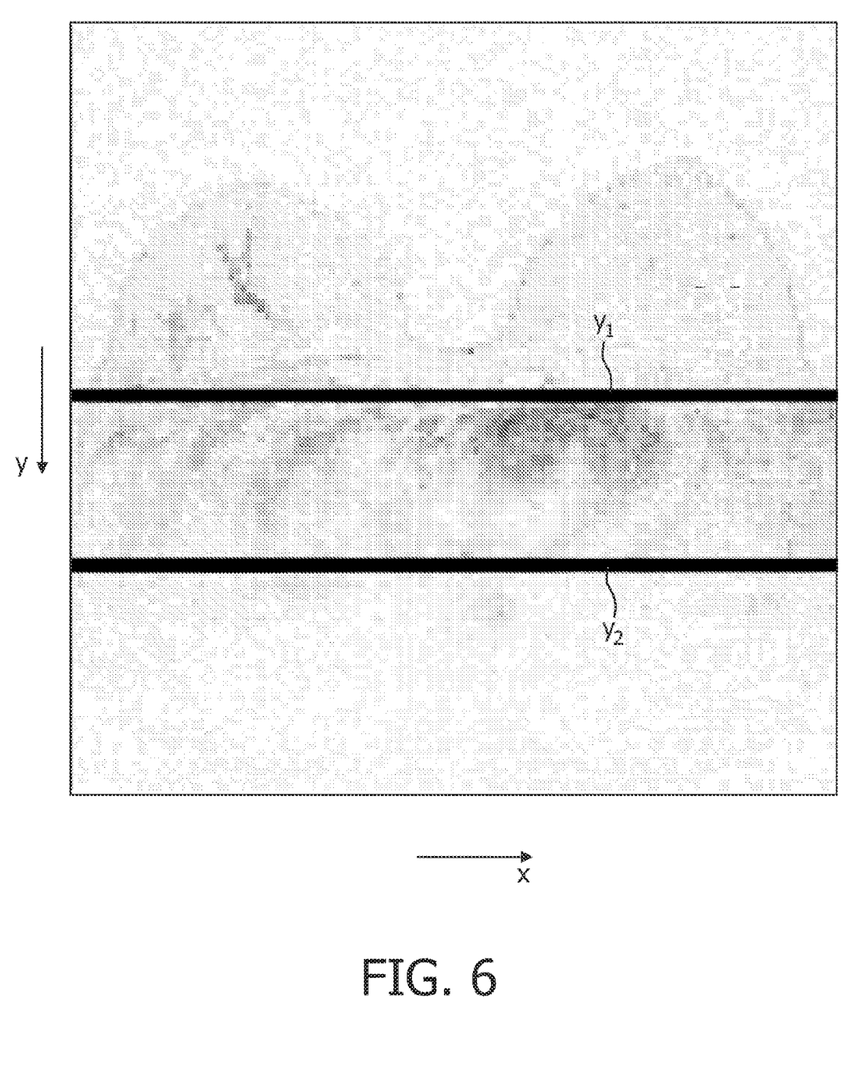
FIG. 6 shows an exemplary axial view of an of exemplary time-variability map annotated with a front band-limit value and a back band-limit value.

In an implementation of the method 100, the artifact region is an artifact band. The artifact band is defined by the front band-limit curve $y_1$ and the back band-limit curve $y_2$ computed using the described line-based segmentation in the classifying step 120. The artifact band comprises every location (x, y, z) comprised in the temporally acquired image data such that $y_2(z) \geq y \geq y_1(z)$. FIG. 6 shows an axial section of the time-variability map $\sigma_1$ with the front band-limit value $y_1(z)$ and the back band-limit value $y_2(z)$. The values of the shown projection map are mapped into the image grayscale for graphically displaying said values using shades of gray. The skilled person will appreciate the fact that the curves $y_1$ and $y_2$ may also be computed on the basis of the set of artifact locations classified using another classification technique, for example, a technique based on thresholding, i.e. evaluating values of a map against a threshold, described above in the present document, or a technique based on level sets described in Ref. 2.

The skilled person will understand the dichotomy of the two regions: the artifact region and the non-artifact region. In particular, the skilled person will appreciate that it is possible to implement the method 100 by classifying locations of the temporally acquired image data as non-artifact locations and by determining the artifact region and the non-artifact region on the basis of this classification. For example, the non-artifact region may be the largest connected component of the set of non-artifact locations. A location (x, y, z) may be classified as a non-artifact location if σ(x, y, z) is less than a predetermined threshold. The complement of the non-artifact region, i.e. the set comprising locations of the temporally acquired image data which are not comprised in the non-artifact region, is the artifact region.

In an implementation of the method 100, the method 100 further comprises a detecting step 130 for detecting an object in the non-artifact region. The detecting step 130 may employ any detection method, for example a detection method based on feature extraction and/or pattern recognition. Suitable methods are described, for example, in US20040052328 entitled "Computer assisted analysis of tomographic mammography" and in US20050027188 entitled "Method and apparatus for automatically detecting breast lesions and tumors in images". Determining the artifact region advantageously reduces the possibility of erroneously identifying the detected object as an object of interest.

The order of steps in the described implementations of the method 100 of the current invention is not mandatory, the skilled person may change the order of some steps or perform some steps concurrently using threading models, multi-processor systems or multiple processes without departing from the concept as intended by the present invention. Optionally, two or more steps of the method 100 of the current invention may be combined into one step. Optionally, a step of the method 100 of the current invention may be split into a plurality of steps. Some steps of the method 100 are optional and may be omitted.

The method 100, such as the one illustrated by the flowchart diagram in FIG. 1, can be implemented as a computer program product and can be stored on any suitable medium such as, for example, magnetic tape, magnetic disk, or optical disk. This computer program can be loaded into a computer arrangement comprising a processing unit and a memory. The computer program product, after being loaded, provides the processing unit with the capability to carry out the steps of the method 100.

Figure 7:
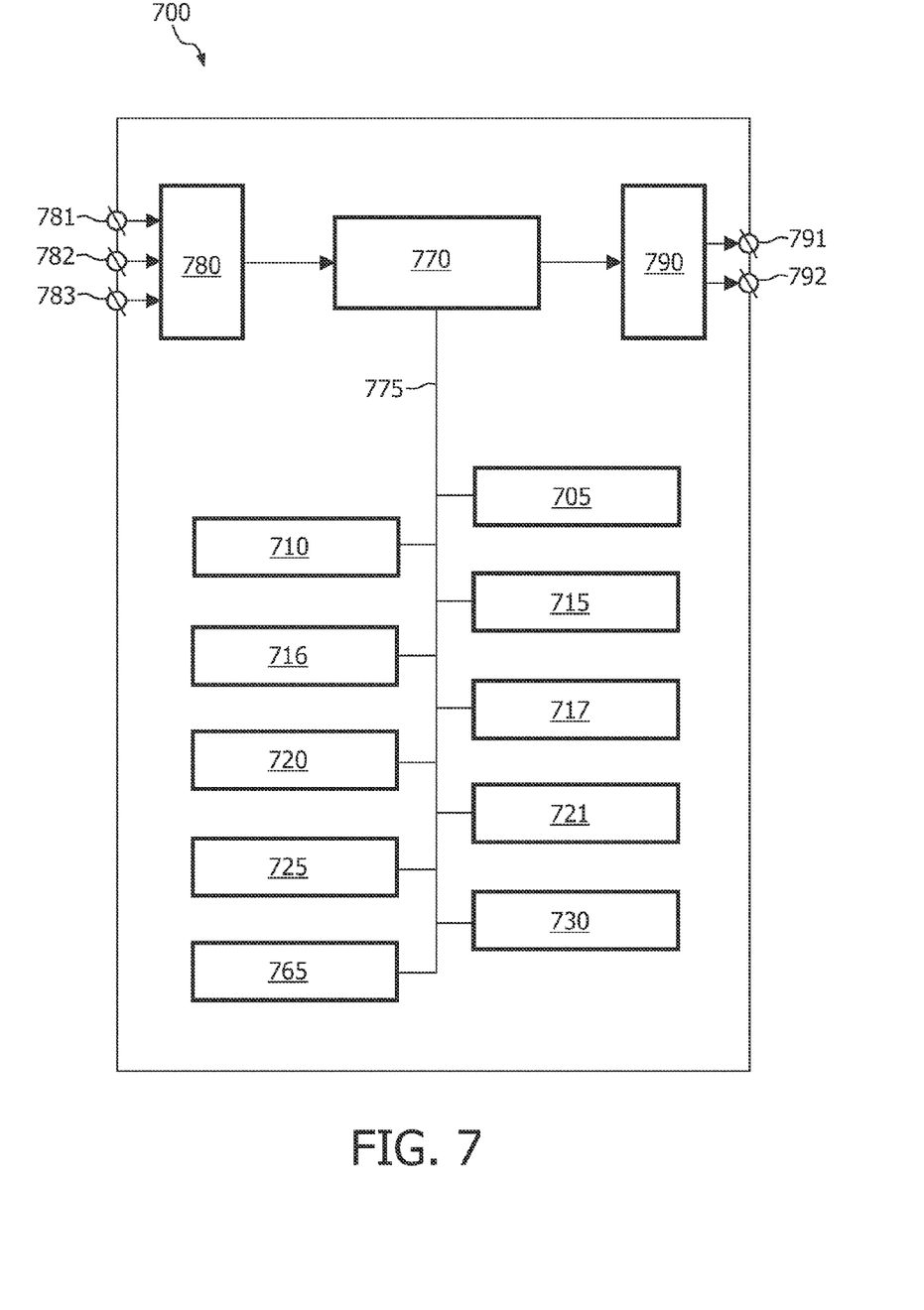
FIG. 7 schematically shows an exemplary embodiment of the system.

FIG. 7 schematically shows an exemplary embodiment of a system 700 for processing temporally acquired image data, comprising:

an obtaining unit 705 for obtaining the temporally acquired image data;

a computing unit 710 for computing a time-variability map on the basis of the temporally acquired image data;

a first projecting unit 715 for projecting the time-variability map in a first projection direction, thereby determining a first projection map;

a first filtering unit 716 for filtering the time-variability map;

a second projecting unit 717 for projecting the first projection map in a second projection direction, thereby determining a second projection map;

a classifying unit 720 for classifying locations of the temporally acquired image data on the basis of the time-variability map;

a second filtering unit 721 for filtering the classified locations;

a determining unit 725 for determining an artifact region and a non-artifact region in the temporally acquired image data on the basis of the classified locations;

a detecting unit 730 for detecting an object in the non-artifact region;

a user interface 765 for communicating with the user of the system 700; and a memory unit 770 for storing data.

In the embodiment of the system 700 shown in FIG. 7, there are three input connectors 781, 782 and 783 for the incoming data. The first input connector 781 is arranged to receive data coming in from data storage means such as, but not limited to, a hard disk, a magnetic tape, a flash memory, or an optical disk. The second input connector 782 is arranged to receive data coming in from a user input device such as, but not limited to, a mouse or a touch screen. The third input connector 783 is arranged to receive data coming in from a user input device such as a keyboard. The input connectors 781, 782 and 783 are connected to an input control unit 780.

In the embodiment of the system 700 shown in FIG. 7, there are two output connectors 791 and 792 for the outgoing data. The first output connector 791 is arranged to output the data to data storage means such as a hard disk, a magnetic tape, a flash memory, or an optical disk. The second output connector 792 is arranged to output the data to a display device. The output connectors 791 and 792 receive the respective data via an output control unit 790.

The skilled person will understand that there are many ways to connect input devices to the input connectors 781, 782 and 783 and the output devices to the output connectors 791 and 792 of the system 700. These ways comprise, but are not limited to, a wired and a wireless connection, a digital network such as a Local Area Network (LAN) and a Wide Area Network (WAN), the Internet, a digital telephone network, and an analogue telephone network.

In an embodiment of the system 700 according to the invention, the system 700 comprises a memory unit 770. The system 700 is arranged to receive input data from external devices via any of the input connectors 781, 782, and 783 and to store the received input data in the memory unit 770. Loading the input data into the memory unit 770 allows quick access to relevant data portions by the units of the system 700. The input data comprises, but is not limited to, the temporally acquired image data. The memory unit 770 may be implemented by devices such as a Random Access Memory (RAM) chip, a Read Only Memory (ROM) chip, and/or a hard disk. Preferably, the memory unit 770 comprises a RAM for storing the input data and/or output data. The output data comprises, but is not limited to, a specification of the determined artifact region and/or non-artifact region. The memory unit 770 is also arranged to receive data from and deliver data to the units of the system 700 comprising the obtaining unit 705, the computing unit 710; the first projecting unit 715, the first filtering unit 716, the second projecting unit 717, the classifying unit 720, the second filtering unit 721, the determining unit 725, the detecting unit 730, and the user interface 765 via a memory bus 775. The memory unit 770 is further arranged to make the output data available to external devices via any of the output connectors 791 and 792. Storing the data from the units of the system 700 in the memory unit 770 advantageously improves the performance of the units of the system 700 as well as the rate of transfer of the output data from the units of the system 700 to external devices.

Alternatively, the system 700 does not comprise the memory unit 770 and the memory bus 775. The input data used by the system 700 is supplied by at least one external device, such as an external memory or a processor, connected to the units of the system 700. Similarly, the output data produced by the system 700 is supplied to at least one external device, such as an external memory or a processor, connected to the units of the system 700. The units of the system 700 are arranged to receive the data from each other via internal connections or via a data bus.

In a further embodiment of the system 700 according to the invention, the system 700 comprises a user interface 765 for communicating with the user of the system 700. The user interface 765 may be arranged to accept a user selection of a threshold for classifying locations of the temporally acquired image data and/or for executing one or multiple filtering steps of the method 100. The user interface 765 may be further arranged to produce an output data stream for displaying a view from the time-variability map and for visualizing the artifact region and the non-artifact region. Optionally, the user interface may implement a plurality of modes of operation of the system 700, such as a mode using one of several algorithms suitable for classifying locations of the temporally acquired image data, which may be implemented by the system 700. The skilled person will understand that more functions can be advantageously implemented in the user interface 765 of the system 700.

Figure 8:
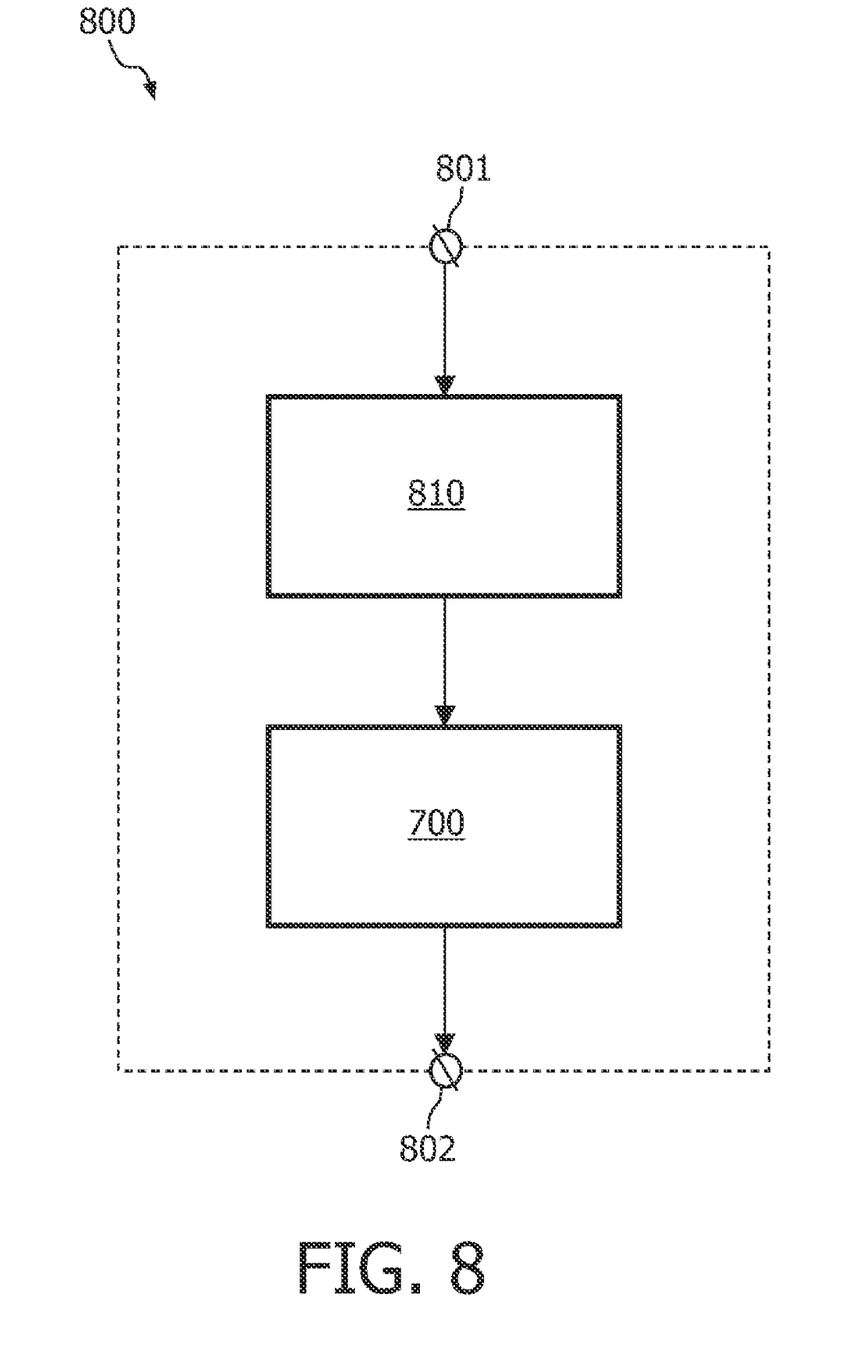
FIG. 8 schematically shows an exemplary embodiment of the image acquisition apparatus.

FIG. 8 schematically shows an exemplary embodiment of the image acquisition apparatus 800 employing the system 700, said image acquisition apparatus 800 comprising an image acquisition unit 810 connected via an internal connection with the system 700, an input connector 801, and an output connector 802. This arrangement advantageously increases the capabilities of the image acquisition apparatus 800 by providing said image acquisition apparatus 800 with advantageous capabilities of the system 700 for processing the temporally acquired image data. Examples of image acquisition apparatus comprise, but are not limited to, a CT system, an X-ray system, an MRI system, a US system, a PET system, a SPECT system, and a Nuclear Medicine system.

Figure 9:
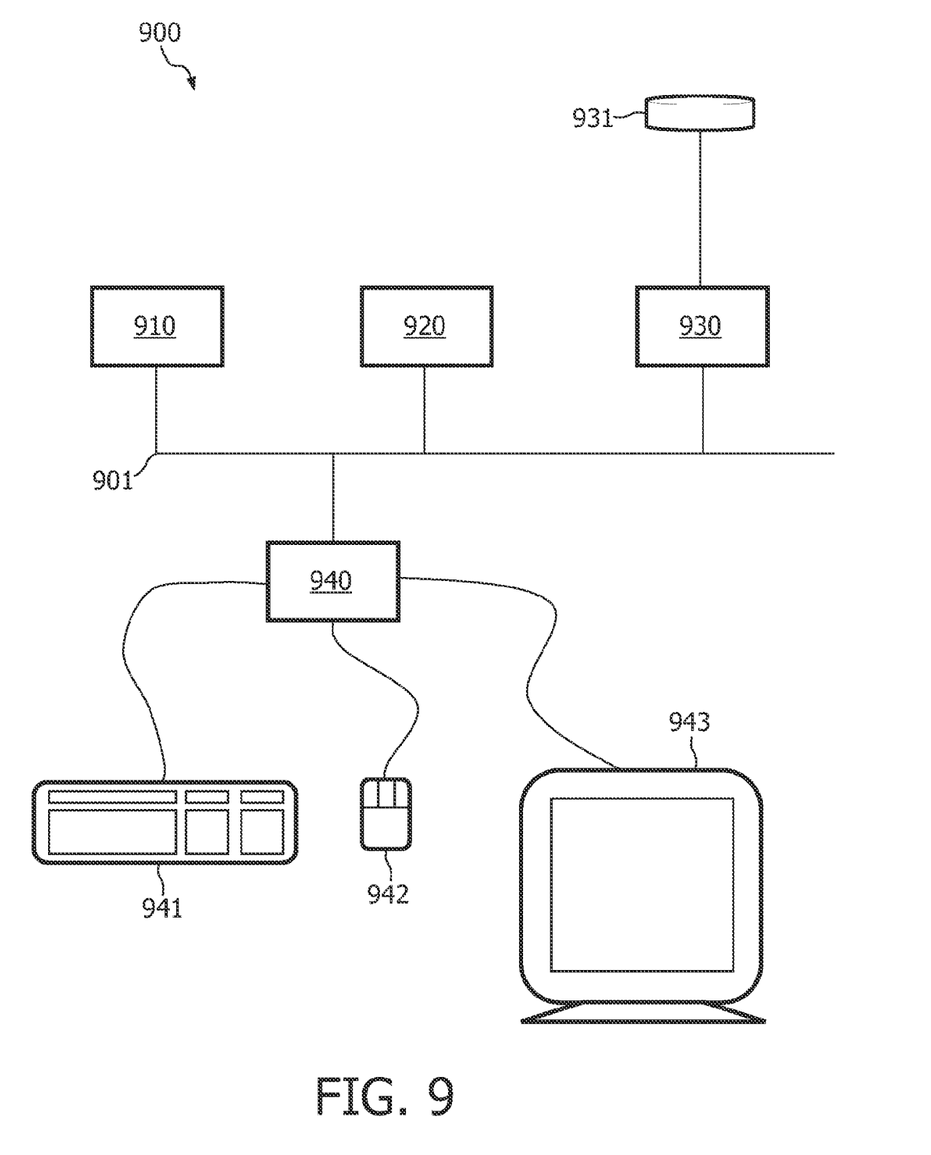
FIG. 9 schematically shows an exemplary embodiment of a workstation.

FIG. 9 schematically shows an exemplary embodiment of a workstation 900. The workstation comprises a system bus 901. A processor 910, a memory 920, a disk input/output (I/O) adapter 930, and a user interface (UI) 940 are operatively connected to the system bus 901. A disk storage device 931 is operatively coupled to the disk I/O adapter 930. A keyboard 941, a mouse 942, and a display 943 are operatively coupled to the UI 940. The system 700 of the invention, implemented as a computer program, is stored in the disk storage device 931. The workstation 900 is arranged to load the program and input data into memory 920 and execute the program on the processor 910. The user can input information to the workstation 900 using the keyboard 941 and/or the mouse 942. The workstation is arranged to output information to the display device 943 and/or to the disk 931. The skilled person will understand that there are numerous other embodiments of the workstation 900 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and/or by means of a programmed computer. In the system claims enumerating several units, several of these units can be embodied by one and the same item of hardware or software.

The usage of the words first, second and third, et cetera does not indicate any ordering. These words are to be interpreted as names.

The invention claimed is:

1. A method of processing temporally acquired image data comprising:
    obtaining the temporally acquired image data;
    computing with a processor a time-variability map on the basis of the temporally acquired image data;
    classifying with the processor locations of the temporally acquired image data on the basis of the time-variability map; and
    determining with the processor an artifact region and a non-artifact region in the temporally acquired image data on a basis of the classified locations.

2. A method as claimed in claim 1, further comprising: obtaining a first projection map on the basis of a first projection of the time-variability map in a first projection direction.

3. A method as claimed in claim 2, further comprising: obtaining a second projection map on basis of a second projection of the first projection map in a second projection direction.

4. A method as claimed in claim 1, further comprising: filtering the time-variability map.

5. A method as claimed in claim 1, further comprising: filtering the classified locations of the temporally acquired image data.

6. A method as claimed in claim 1, wherein the artifact region is an artifact band.

7. A method as claimed in claim 1, further comprising a detecting an object in the non-artifact region.

8. A system for processing temporally acquired image data comprising:
    an obtaining unit for obtaining the temporally acquired image data;
    a computing unit for computing a time-variability map on the basis of the temporally acquired image data;
    a classifying unit for classifying locations of the temporally acquired image data on the basis of the time-variability map; and
    a determining unit for determining an artifact region and a non-artifact region in the temporally acquired image data on the basis of the classified locations.

9. An image acquisition apparatus comprising a system as claimed in claim 8.

10. A workstation comprising a system as claimed in claim 8.

11. A computer program product to be loaded by a computer arrangement, comprising instructions for processing temporally acquired image data, the computer arrangement comprising a processing unit and a memory, the computer program product, after being loaded, providing said processing unit with the capability to carry out the following tasks:
    obtaining with a processor the temporally acquired image data;
    computing with the processor a time-variability map on a basis of the temporally acquired image data;
    classifying with the processor locations of the temporally acquired image data on a basis of the time-variability map; and
    determining with the processor an artifact region and a non-artifact region in the temporally acquired image data on thea basis of the classified locations.

* * * * *